June 11, 1929. K. KOBORI 1,717,227
METHOD OF COCOON STORAGE BY COOLING AND DRYING
Filed Aug. 25, 1925
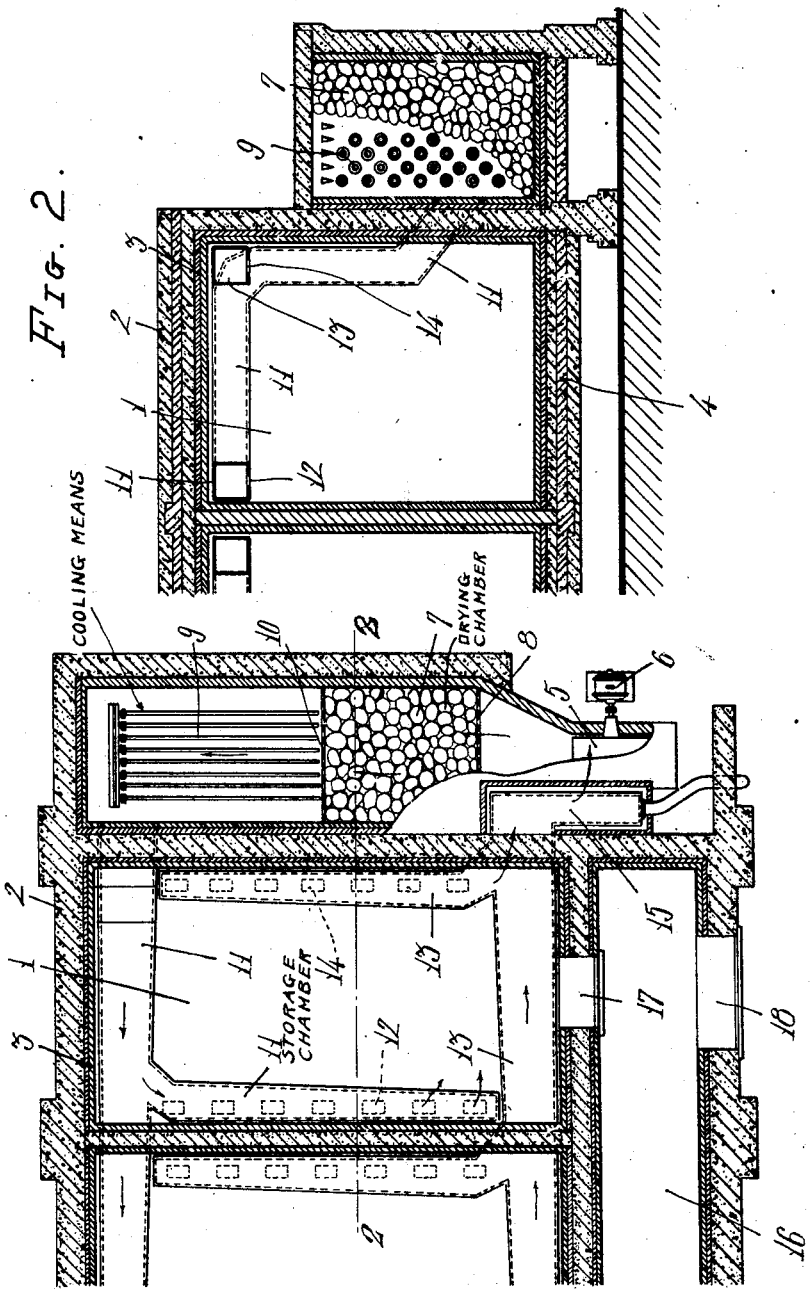

Patented June 11, 1929.

1,717,227

UNITED STATES PATENT OFFICE.

KIHACHIRO KOBORI, OF KOBE, JAPAN, ASSIGNOR TO KANEGAFUCHI BOSEKI KABU-SHIKI KWAISHA, OF 1612 SUSNIDAMURA, MINAMIKATSUCHIKA-GUN, TOKYO-FU, JAPAN.

METHOD OF COCOON STORAGE BY COOLING AND DRYING.

Application filed August 25, 1925. Serial No. 52,462.

This invention relates to improvements in a method of storing raw cocoons in air-tight chamber protected against heat after having been dried and cooled, according to the invention by being subjected to the action of dry air at a temperature near the freezing point, but not so low as to cause freezing of the moist pupæ. The invention has for its object to eliminate the special measures ordinarily employed to destroy the life of the pupæ and to render possible the continuous drying and storage of cocoons in the same chamber.

The invention consists essentially of the following steps: first, removing the moisture from the air; second, cooling the air to a temperature slightly above freezing to avoid freezing the moisture of the pupæ; and third, circulating the dried cooled air through the cocoons in the air tight chamber. The life of the pupæ is thus destroyed and the cocoon is in a condition to be safely stored, for a long period.

The cooling, as well as the circulation, of air in accordance with the present method not only accelerates the cooling process, but the circulation of the air will also accelerate destruction of the pupæ while the air, having been deprived of its moisture, will, during circulation, cause rapid evaporation of the pupæ and cocoons.

The present method further ensures against decomposition of the pupæ undergoing treatment.

It has been found that the live pupæ exist in relatively low temperatures when the surrounding air is not in motion, while rapid destruction of life occurs when the air is caused to circulate. As no heat or chemicals are employed in accordance with the present invention equipment necessary in carrying the method into effect is simple, and the losses ordinarily sustained by deterioration due to treatment by heat or chemicals is avoided.

According to the invention the method of treatment and storage of cocoons is as follows: The cocoons are spread and the inferior and useless ones separated out. After placing the proper quantity of cocoons in bags of suitable material and closing the mouths thereof, the bags are placed in an airtight chamber or, if preferred, the cocoons may be spread over flat shallow bamboo baskets supported on shelves in the air-tight chamber leaving adequate space between the baskets. The walls of the chamber are adequately insulated from external heat. In another room or outside of the air-tight chamber the air is treated to remove the moisture therefrom, as by passing through calcium chloride or the desiccative made from acid clay after having its dust kneaded with water into balls and heated to about 300° C., and then brought to a temperature of approximately 20° to 30° F. The dried air is circulated in the above mentioned air-tight chamber and the treatment is continued for approximately twenty days, and after drying the cocoons sufficiently the supply of cool air is shut off and the cocoons are stored air-tight in the chamber. The cocoons are then capable of being stored for a long period even though the temperature becomes normal. If necessary the circulation of the dried cooled air may be again resorted to for a period of two days at each two or three months, interval.

If the air is cooled below the above mentioned temperature the life of the pupæ may be destroyed due to the lowering of temperature even though the circulation of air at such low temperature causes freezing of the moisture of the pupæ and the subsequent increase of temperature and humidity causes a decomposition of the cocoons, and as it is true that the more the air is cooled the more the relative humidity, even the changing of the air would not produce the drying effect, if the air is not deprived of its moisture with the cooling.

The drying of the air, as above stated, is effected by chloride of calcium or acid clay kneaded and heated. Calcium chloride, for instance, has been found by experiment to have the necessary absorbing capacity at approximately freezing temperature as compared with the normal temperature, and is accordingly effective for the purpose. In cases where no drying agent such as above mentioned is employed, the cooled damp air from the storage room is conducted to the cooling installation and cooled down below the freezing point, but not sufficiently low to cause freezing of the pupæ, and thereafter the air is circulated again in the storage chamber. This plant may be effectual in cooling and drying the air if somewhat high in temperature for the air is in practice almost entirely deprived of its moisture by the cooling.

An apparatus for carrying out the method according to the present invention is illustrated in the accompanying drawing in which:

Fig. 1 is a partially horizontal section of the apparatus and

Fig. 2 is a vertical section on the line 2—2 of Fig. 1.

Referring to the drawing in detail the numeral 1 indicates the storage chamber, the outer wall 2 of which is of hollow tile coated mortar and the ceiling and the walls are provided internally with a lining 3 of cork, preferably doubled. The floor 4 is of concrete and a circulating fan 5 is operated by a motor 6. The drying chamber is indicated at 7 and contains the drying chemicals, and for this chamber the air is conducted in the direction of the arrows through the net 8. 9 indicates the cooling means arranged laterally of the chamber 7 for reducing the temperature of the air to approximately 20–30° F. after the latter has passed through the net 10. The dried cooled air is conducted by the inlet pipe 11 having perforations 12 on its under side. The air return pipe is indicated at 13 and is provided with perforations 14 on its under side and the end 15 of the air return pipe 13 is connected with the inlet of the fan 5 by which the air is returned to the drying chamber 7 and maintained in circulation. A passage 16 for the purpose of transportation of cocoons to the storage chamber 1 is provided and is in communication with the entrance 17 communicating with said chamber, a door for the passage 16 being indicated at 18.

In the apparatus the air is circulated by the fan 5, deprived of its moisture in the chamber 7 and cooled by the cooling device 9 and passing through the inlet pipe 11 enters the storage chamber 1 through the perforations 12, and thus the air while circulating in the storage chamber comes in contact with the raw cocoons causing destruction of the life of the pupæ and drying the latter, and the cocoons are placed in a condition for extended and safe storage. The air within the chamber 1 returns to the fan through the return pipes 13 and 15 and circulation of the air through the chamber 1 is thus maintained.

I claim:—

A new method of cocoon-storage by cooling and drying characterized by placing the raw cocoons in an air-tight chamber protected against heat, into which is sent cool dried air, the air being cooled down to a temperature not so low as to cause freezing of moisture within pupæ, and deprived of its humidity, the cocoons being then in a condition to be safely stored for a long period substantially as described.

In witness whereof I have hereunto set my hand.

K. KOBORI.